United States Patent

Czwakiel et al.

[15] 3,667,282
[45] June 6, 1972

[54] FLUIDIC GAGING SENSOR HEAD

[72] Inventors: Bert J. Czwakiel; Donald F. Miller, both of Schenectady, both of, Schenectady, N.Y.

[73] Assignee: General Electric Company

[22] Filed: Feb. 18, 1970

[21] Appl. No.: 12,289

[52] U.S. Cl. ............................................................73/37.7
[51] Int. Cl. ...................................................... G01b 13/08
[58] Field of Search .........................................73/37.5–37.7

[56] References Cited

UNITED STATES PATENTS

| 2,402,293 | 6/1946 | Nye ..................................... 73/37.7 X |
| 3,199,339 | 10/1965 | Lipski ..................................... 73/37.7 |
| 3,282,085 | 11/1966 | Benson et al. ........................... 73/37.7 |

Primary Examiner—Louis R. Prince
Assistant Examiner—William A. Henry, II
Attorney—David M. Schiller, Arthur E. Fournier, Jr., Frank L. Neuhauser, Oscar B. Waddell and Joseph B. Forman

[57] ABSTRACT

The sensor head component of an apparatus for monitoring a selected parameter of a continuous material such as yarn, metal rod, tubing and the like, includes a fluidic long, narrow channel for passage of the material therethrough. Pressurized fluid is supplied to the center of the channel formed by a cover plate member and slotted plate member. Passage of the monitored material through the channel varies the restriction thereof in proportion to the magnitude of the monitored parameter and develops a variable back pressure linearly proportional thereto. A toggle clamp provides alternate engagement with and separation of the plate members. A spring device connected to the cover plate member provides a means for loading and threading a yarn material in the sensor head without stopping the longitudinal motion of the yarn.

5 Claims, 3 Drawing Figures

PATENTED JUN 6 1972 3,667,282

INVENTORS:
BERT J. CZWAKIEL;
DONALD F. MILLER, by Louis A. Moncha

FLUIDIC GAGING SENSOR HEAD

Our invention relates to a sensor head component of an apparatus for continuous monitoring of a selected parameter such as outside diameter, cross sectional area or denier of a continuous, small cross section material, and in particular, to a fluidic gaging sensor head adapted for threading the monitored material through the sensor head without stopping the longitudinal motion of such material.

A fluidic gage apparatus for continuous monitoring of a particular parameter such as wire diameter, sliver density and the like is disclosed and claimed in a copending U.S. Pat. application Ser. No. 800,623, to Hansjoerg Stern, filed Feb. 19, 1969 and assigned to the assignee of the present invention. The sensor head employed in such earlier apparatus is satisfactory but lacks the capability of being adapted for threading or loading the sensor head while the monitored material is continually moving in the longitudinal direction. A gaging apparatus for continuous in-process monitoring desirably should have this capability without stopping the motion of the monitored material for purposes of achieving a maximum rate of production of such material.

Therefore, one of the principal objects of our invention is to provide an improved sensor head component of a gaging apparatus which is capable of being threaded or loaded, while the material is in motion.

The sensor heads disclosed in the foregoing patent application to Stern are of the sharp orifice type which do not provide a laminar flow of pressurized fluid through the gaging channel of the sensor head and therefore does not result in a linear relationship between the magnitudes of an induced back pressure and the selected monitored parameter, as is desired in many cases.

Therefore, another object of our invention is to provide the sensor head with a channel adapted for developing a laminar flow of pressurized fluid therein.

Finally, in the case of monitoring a multi-strand continuous yarn material such as a thread or sliver, no prior art is known for adopting a sensor head to rapidly collect the individual strands and force them into the channel of the sensor head in the threading operation. Therefore, a still further object of our invention is to provide the sensor head with a spring loader device operative only during the threading or loading operation of the monitoring apparatus.

Another object of our invention is to provide a new method for loading or threading the sensor head with the material to be monitored while such material is in motion.

In accordance with the object of our invention, we provide a sensor head component which includes a slotted plate member having a first slotted surface and a cover plate member having a first nonslotted surface. In the engaged state of the two plate members, the first surfaces form a channel therebetween for passage of a small cross section, continuous material being monitored by the sensor head. Pressurized fluid is supplied to the center of the channel to cause a laminar flow of the fluid toward the two ends of the channel, the flow being restricted by the monitored material passing therethrough and developing a back pressure at the point of issuance of the fluid into the channel. The magnitude of the back pressure varies linearly with the magnitude of the particular parameter being monitored. A mechanical arrangement such as a toggle clamp provides a hold-down action for obtaining mating of the plate members in the engaged state thereof. A retractable spring loader device may be connected to the cover plate member for collecting and forcing a yarn-like material being monitored into the slot during the threading or loading operation wherein the cover plate member is separated from the slotted plate member and then initially engaged in a nonlocked position.

The features of our invention which we desire to protect herein are pointed out with particularity in the appended claims. The invention itself, however, both as to its organization and method of operation, together with further objects and advantages thereof may best be understood by reference to the following description taken in connection with the accompanying drawing wherein like parts in each of the several figures are identified by the same reference character and wherein:

Figure 1:
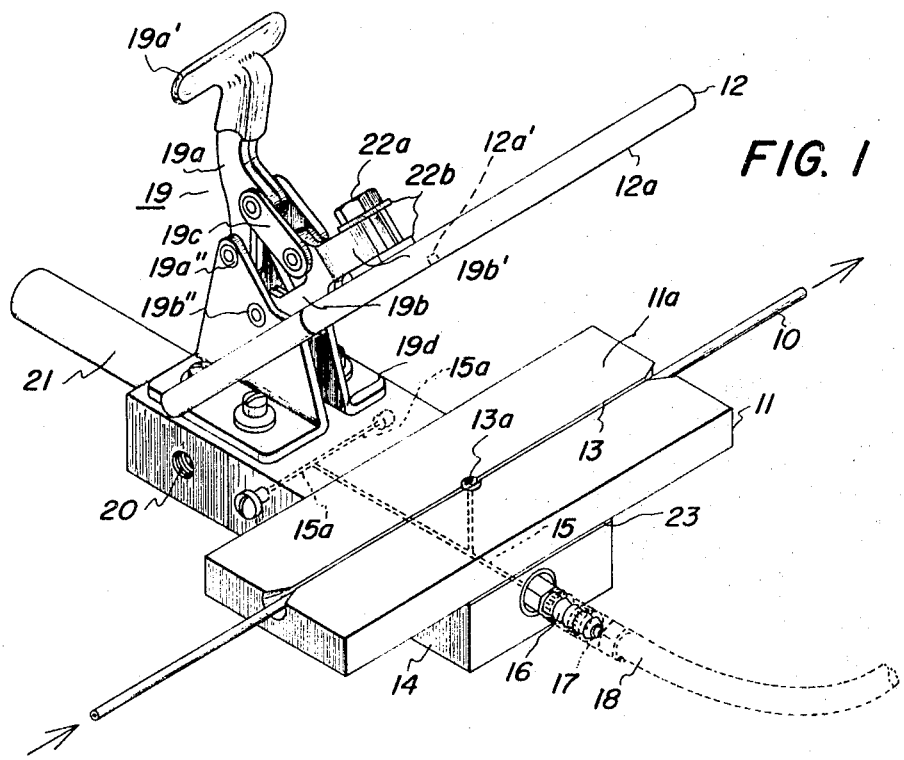
FIG. 1 is a perspective view of the sensor head constructed in accordance with our invention illustrating the separated state of the cover and slotted plate members and a tubing material to be monitored thereby.

Referring now in particular to FIG. 1, there is shown our sensor head adapted for monitoring, and, or, gaging, the outside diameter of a tubular material 10 which may be metal, plastic or virtually any material nonreactive with a fluid medium employed in the sensor head. The arrow heads indicate one direction of motion of the monitored tubular material through the sensor head, it being understood that the longitudinal motion may also be in the opposite direction since the sensor head is of symmetrical construction. The sensor head is a component of an apparatus which permits continuous, non-destructive in-process monitoring, and if desired, gaging, of a particular parameter of the continuous material passing through the sensor head. Thus, the apparatus may be employed merely for monitoring (i.e., detecting changes in the outside diameter of) tubing 10, or for the gaging (i.e., measuring the outside diameter) thereof.

Figure 2:
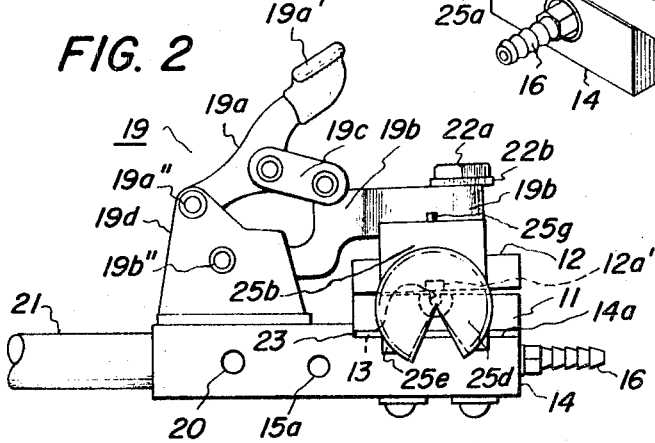
FIG. 2 is a side view of the engaged state of the cover and slotted plate members of the FIG. 1 sensor head with the addition of a retractable spring loader device shown in its non-retracted position.

The sensor head is basically comprised of a slotted plate member 11 having a first slotted surface 11a, and a cover plate member 12 having a first nonslotted surface 12a. Slot 13 is disposed at approximately the centerline of surface 11a and extends entirely thereacross, preferably in the longest direction thereof. Surfaces 11a and 12a, when engaged in mating relationship, form a channel defined by slot 13 and the portion of surface 12a in direct communication therewith. Members 11 and 12 may be of any shape, although they preferably are of the same general shape, our preferred embodiment being rectangular. Member 12 preferably has a length dimension slightly exceeding that of member 11 such that member 12 slightly overhangs member 11 at the ends thereof for purposes of insuring a more positive loading of the tubular material into slot 13. The overhanging sides of member 12 have a rounded lower edge to minimize the possibility of such edge damaging the monitored material with which it may occasionally come in contact. Slot 13 is straight and equidimensioned along the length thereof, although it is preferably provided with flared ends for ease of entrance and exit of the material being monitored. In addition, the central region 13a of the slot may be of slightly enlarged dimension, as illustrated, for ease of admission of a pressurized fluid introduced into the slot in the engaged state of the slotted and cover plate members as hereinafter described. A slight extension of hole 13a is formed approximately one-eighth inch into surface 12a as shown in FIGS. 1 and 2 as 12a'. The ratio of slot length to width is at least 10:1 to assure a laminar flow of the fluid from the central region to the two outer ends thereof. The channel formed by the slot thus is an effective laminar-type fluid restrictor which provides a variable restriction to fluid flow therethrough in accordance with variable dimensions in the tubular material passing therethrough. The laminar flow is desired since it provides a linear relationship of the monitored parameter and the fluid back pressure induced at central region 13a by the restrictive effect of the material passing through the channel. The cross-sectional area and width of slot 13 is slightly larger than the largest anticipated area and width of the material being monitored. The cross section outline of slot 13 also generally conforms to that of the monitored material. Thus, in the specific application illustrated in FIG. 1 wherein monitored material 10 is a metal tubing, the cross section of slot 13 is semicircular near the bottom and a slight vertical extension near the top as more clearly indicated in the side view of FIG. 2. Alternatively, the cross section of slot 13 may be merely semicircular, but in such a larger radius would be necessary since the monitored material is circular in cross section and loaded into the slot from the top. It can be appreciated that in the case of material 10 being a square cross section rod, the cross section of slot 13 is preferably a larger square or rectangular.

The pressurized fluid, which may be a gas such as air or liquid such as water, is supplied to the central region 13a of the enclosed channel from an external source of the pressurized fluid by any convenient means. As one example, not to be considered a limitation of such means, a base member 14 is connected to the bottom of slotted plate member 11 which is the surface opposite from the slotted surface 11a. Base member 14 may have any of a number of shapes, the illustrated one being generally rectangular and having an upper surface including a depressed region 14a which serves to retain slotted plate member 11 in its proper orientation. Members 11, 12 and 14 may be fabricated of materials such as aluminum, stainless steel, plastic, and the like, the particular material being governed in part by the material 10 being monitored and the environment of operation. Member 14 has a thickness (height dimension) greater than that of plate members 11, 12 and is provided with a passage 15 (shown in dashed outline) formed into its side and passing horizontally inward toward the center thereof in the orientation of the sensor head illustrated in FIG. 1. This internal passage 15 is thence formed vertically upward from the center region of member 14 and passes into slotted plate member 11 terminating in a port at the slot central region 13a. Depending upon the diameter of this internal passage 15 relative to the width dimension (in cross section) of slot 13, the juncture of passage 15 and slot 13 may result in the enlarged region 13a of the center of slot 13. A suitable fitting 16 is fastened in any convenient manner into the side of member 14 for connection with a coupling 17 connected to the end of a conduit 18 which in turn is connected to the source (not shown) of the pressurized fluid. Internal passage 15 therefore forms a confined passage for fluidically coupling fitting 16 to the port at the center of slot 13. Base member 14 may be connected to the bottom of plate member 11 in any convenient form, two machine screws and associated washers being utilized as one example as indicated in FIG. 2. Rubber gasket 23 assumes a fluid-tight seal between members 11 and 14.

Figure 3:
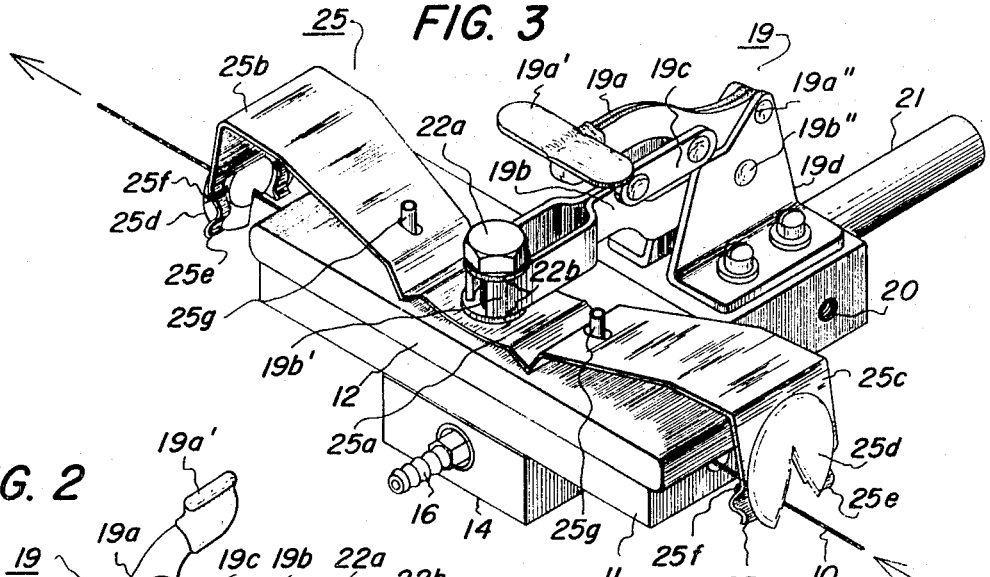
FIG. 3 is a perspective view of the sensor head shown in FIG. 2 with the retractable spring loader in its retracted position and a yarn material being monitored.

The plate members 11 and 12 of our sensor head are in the separated state illustrated in FIG. 1 when in the process of loading or threading the material 10 into the head and are in the engaged state illustrated in FIG. 3 during the monitoring mode of operation. Plate members 11 and 12 are alternately engaged in mating relationship and separated by any convenient means which readily accomplishes this function in a minimum time and with minimum effort. As one example of such means, a conventional toggle clamp 19 of the quick-release type is especially well adapted for this application in providing a hold-down action in the closed and locked state thereof. Toggle clamp comprises an actuating member 19a, an actuated member 19b, a linkage 19c for coupling members 19a and 19b, and a nonmovable base member 19d. Actuating member 19a is a first lever arm having a handle or actuating end 19a' and a fulcrum end 19a" connected to base member 19d. Actuated member 19b is the driven element of the clamp and is a second lever arm having a driven end 19b' connected to the top surface of cover plate member 12, and a fulcrum end 19b" connected to base member 19d. Linkage 19c connects the two lever arms and is oriented with respect thereto such that pressing down on handle end 19a' with a minimum force causes driven end 19b' to move downward until surfaces 11a and 12a are engaged in mating relationship but in an unlocked state; further depression of handle end 19a' causes linkage 19c to force surfaces 11a and 12a to be engaged in a locked state. Clamp base member 19d is connected to sensor head base member 14 by means of four machine screws and associated washers. Driven end 19b' of lever arm 19 is connected to cover plate member 12 by means of a shoulder screw 11a and a pair of rubber washers 22b.

Base plate member 14 may also be provided with additional fluid passages 15a formed through opposite sides thereof as illustrated in dashed outline in FIG. 1. Such additional passages are normally plugged when not in use since they have a common juncture with passage 15 in the region where such passage changes direction from horizontal to vertical. Member 14 is further provided with at least one mounting hole 20 for supporting the sensor head slotted plate member 11 and base member 14 in a stationary position. Mounting hole 20 is internally threaded and may conveniently be disposed toward the rear of one or both sides of member 14 as illustrated in FIG. 2 and also in the back end of member 14 for mounting on a suitable fixed support such as partially threaded mounting rod 21. The preferred embodiment of our sensor head is provided with all three of the mounting holes to permit greater latitude in mounting arrangements for the sensor head.

The operation of our sensor head as illustrated in FIG. 1 will now be explained. The sensor head component of the monitoring apparatus is mounted in the required orientation such that slot 13 is aligned with a continuous material 10 to be monitored by the apparatus. The material 10 is loaded or threaded into the sensor head in the following manner. Flow of the pressurized fluid through conduit 18 to the sensor head is preferably, although not necessarily, stopped by any suitable means. Toggle clamp 19 is initially in its open position as illustrated in FIG. 1 and the material 10 is forced downward into slot 13 of slotted plate member 11. Upon the material being disposed within slot 13, it being recognized that the material may be continually moving in the longitudinal direction indicated by the arrow heads during the threading operation, the toggle clamp is operated into its closed and locked position. Upon locking of the toggle clamp, there is initiation of flow of the pressurized fluid through passage 15 to central region 13a of the channel through which material 10 is moving. The pressurized fluid flows in a laminar mode from central region 13a to the atmosphere at the outer ends of the channel. The variable restriction to the laminar fluid flow caused by the variable dimensions of the monitored material continually moving through the channel develops a variable back pressure in region 13a. The magnitude of the back pressure induced at center 13a is detected by a suitable circuit or device having an input connected to conduit 18. Monitored materials such as yarn and slivers that are below a desired denier, or filaments, wires, threads, ropes and rods that are below a desired diameter, present less than normal flow resistance, causing a lower induced pressure while the converse is true if the monitored material is of higher denier or of larger diameter. Thus, a change in induced pressure is directly proportional to a change in denier or diameter of the monitored material. These small pressure changes are amplified by suitable analog-type fluid amplifier circuitry and recorded, or may be converted to electrical signals, amplified, and thence recorded on a suitable device such as strip chart recorder.

In a specific embodiment of the sensor head illustrated in FIG. 1 (and FIGS. 2 and 3) which is adapted for continuous on-line monitoring of natural or synthetic fiber materials, metal wire, tubing, and the like, slotted plate member 11 has a length of 3 ⅛ inch, width of 1 ⅛ inch and height of one-fourth inch. Slot 13 in cross section along the equidimensioned portion thereof is a semicircle having a radius of 0.021 inch, the center of the semicircular arc being displaced 0.021 inch below surface 11a. The ends of slot 13 flare out at an angle of 30° from the longitudinal axis of slot 13 and terminate at the sides of plate member 11 at a 0.25 inch diameter. The central region 13a of slot 13 has a diameter of 0.159 inch which equals the diameter of the passage drilled through members 11 and 14 for communication with conduit 18. Cover plate member 12 has width and height dimensions equal to that of member 11, and a length of 3 ¼ inch. Base member 14 is 1 ⅛ inch in the length direction of plate members 11 and 12, 2 ½ inches in the width direction, and heights of three-eighths inch (below plate member 11) and one-half inch (below the base of toggle clamp 19). Pressurized air at a relatively constant pressure of 1.0 psi gauge is supplied to the sensor head through conduit 18. As an indication of the sensitivity of our sensor head, a change in diameter or denier of the monitored material of ± 1 percent can readily be detected at the supply pressure of 1.0 psig. It should be apparent that sensitivity is improved with increased supply pressure. Finally, the sensitivity must also be considered relative to the entire monitoring apparatus and therefore is also dependent on the degree of amplification of the induced pressure signal and the type of read-out employed in the apparatus.

In general, sensor heads constructed in accordance with our invention are capable of monitoring, and, or gaging materials which pass through at speeds of up to 5,000 feet per minute and higher. A speed of 15,000 feet per minute has been attained, and the maximum speed is governed primarily by the required response and sensitivity to a given length parameter change in the material being monitored. The sensor head is capable of monitoring a minimum diameter of 0.0025 inch, there being no maximum diameter limitation. It should be evident that in the case of fiber materials, the sensor head is suitable for monitoring and, or, gaging parameters such as diameter, cross sectional area, and indirectly denier. The continuous on-line monitoring of the material can be made wherever access to the material is available. In the specific case of monitoring fibers in the textile industry, our invention avoids the present time consuming operation of stopping a fiber line, cutting, transporting and weighing the fibers in order to run a quality check. The monitoring apparatus is compatible with a variety of different diameter materials to be monitored, comparable sensitivity over a wide range of material cross sectional areas, being attained by interchanging slotted plate member 11 with another one having a more suitable slot diameter, or alternatively, the entire sensor head may readily be replaced by dismounting from the mounting means 21 and disconnecting the fitting 16 from coupling 17. In the case wherein the sensor head utilizes pressurized air, it has the advantage of being adapted for use in hazardous environments. The sensor head is suitable for use in areas of severe vibration high temperature and high humidity.

FIG. 2 is a side view of the engaged but unlocked state of the FIG. 1 sensor head and is further provided with a loading or threading means for collecting the strands of a multi-strand yarn material which is to be monitored by the apparatus and for forcing the collected strands into the slot 13 in member 11. The strand collecting and forcing means comprises a spring device 25 which is seen in FIG. 3 to include a central spring member 25a, and a pair of identical end spring members 25b and 25c formed at opposite ends of central spring member 25a. The end spring members may be separate elements but preferably are formed with the central member from a single thin piece of metal such as stainless steel to be sufficiently resilient to exhibit a spring characteristic. Spring device 25 is retained on the upper surface of cover plate member 12 and coupled to toggle clamp driven lever arm 19b by means of shoulder screw 22a passing through a central hole in member 25a. Rubber washers 22b act as flexure couplings between arm 19b and member 12 to accommodate any misalignment which would prevent members 11 and 12 from sealing tightly. End spring members 25b and 25c extend beyond the sides of cover plate member 12 wherein the ends of the channel 13 are disposed and the outer end portions of the end spring members are bent downward and terminate in concave-shaped guides 25 d for the monitored material. The concave-shaped guides 25d may be concave shaped ends of spring members 25b, 25c, but for purposes of minimizing the possibility of damaging the monitored yarn material due to sharp edges of the spring member metal, guides 25d are preferably separate elements suitably attached to the ends of members 25b, 25c. In the illustrated embodiment, guide members 25d are polished ceramic buttons having a removed concave-shaped lower portion (as viewed in FIG. 2) resembling a sector of a circle through which the monitored material travels. The ends of each of spring members 25b, 25c are formed into two separated arms 25e which are crimped. The ceramic guide buttons 25d are attached to the end arms 25e of spring members 25b, 25c by passing the smaller diameter back end of the button between the arms and inserting a pin 25f horizontally through the button back end at the upper inner edge of the arm crimp whereby the inserted pin rests against the crimp and thereby retains the button in place. The lower surfaces of arms 25e bear against the backs of buttons 25d for further support thereof.

Central spring member 25a is crimped at the junctures with end members 25b, 25c, and it can be visualized that this crimping functions to develop a two-state mode of operation of spring device 25, and therefore also of guide members 25d. Thus, in the separated state of plate members 11, 12 (open state of toggle clamp 19) end spring members 25b, 25c (and thus also guide members 25d) are also in an isolated position spaced from the longitudinal axis of slot 13 and monitored material 10. The yarn material is assumed to be continually moving in a longitudinal direction immediately above slot 13. An initial depression of handle end 19a' of the toggle clamp with a minimum of force causes the initial closed but unlocked state of the clamp (and plate members 11, 12) described hereinabove wherein no significant force is impressed on central spring member 25a. In this closed but unlocked state of clamp 19, guide members 25d have been forced downward such that the concave-shaped portions thereof are now below the longitudinal axis of slot 13 thereby collecting the strands of the yarn on the downward stroke and forcing the collected strands into the slot (see FIG. 2). Upon the sensor head being threaded, handle end 19a' is further depressed to achieve the closed and locked state of the clamp (and plate members 11, 12). In the locked state the force exerted by linkage 19c exerts a force on central spring member 25a which bows downward and reacts with the crimps resulting in a retraction of end spring members 25b, 25c (and guide members 25d) to an upward position such that the guide members are spaced from the monitored yarn sufficiently to not interfere therewith (see FIG. 3). This is the normal operating mode of the sensor had when monitoring the material 10. Spring device 25 is sufficiently resilient such that any abnormally large increase in dimension of the material to be monitored will cause a separation of plate members 11, 12 in the engaged but unlocked state thereof. Spring device 25 (and thus also guide member 25d) are retained in alignment with slot 13 by any suitable means, such as a pair of roll pins or dowels 25g passing through end spring members 25b, 25c along the center-line thereof and into cover plate member 12.

From the hereinabove description, it can be appreciated that our invention achieves the objectives set forth in that it provides an improved sensor head component which is capable of being threaded or loaded with the material to be monitored while such material remains in motion. The long and narrow channel in the sensor head through which the material passes provides a laminar flow of the pressurized fluid through the channel resulting in a linear relationship between magnitude of the induced back pressure and the selected parameter being monitored. In addition, this long and narrow channel with the material passing therethrough presents a very high fluid flow resistance as opposed to the use of sharp edged orifices and thus our sensor head is much more sensitive in detecting small changes in the monitored parameter and operates with a lower fluid consumption. The long laminar resistance also allows a looser fitting hole than with an orifice, that is, the channel cross section area is 3 to 4 times the area of the material being monitored, resulting in less tension and abrasion on the material and less wear on the slot 13. The method for threading and loading material to be monitored in our sensor head while the material is in motion is another unique aspect of our invention, particularly in the case of the material being a multi-strand yarn material which is first collected and then forced into the slot while such material is still moving in its longitudinal direction. Thus, our invention provides a nondestructive monitoring of in-process quality changes of a variety of materials without the necessity of stopping, or even slowing down such material.

Having described a specific embodiment of our sensor head, it is believed obvious that modification and variation of our invention is possible in light of the above teachings. Thus, cover and slotted plate members and base member may assume shapes other than the rectangular ones disclosed, the only requirement being that the slot which forms the enclosed channel be sufficiently long and small in cross section to obtain a high resistance to the fluid flow therethrough when the material is being monitored, and that a laminar flow be achieved to obtain the desired linearity between induced back pressure and monitored parameter. Further, the pressurized fluid may be supplied to a passage in cover plate member for issuance into the central region 13a of the channel. In some instances it may be desirable to utilize a slotted plate member 11 of sufficient thickness such that base member 14 may be eliminated. Finally, other types of devices for providing a hold-down action to maintain members 11 and 12 in mating relationship and other types of guide members may be employed.

What we claim and desire to secure by Letters Patent of the United States of America is:

1. In an apparatus for monitoring a selected parameter of a small cross section, continuous material suitable for passage through an improved sensor had component of the apparatus, the improved sensor head comprising, a slotted plate member having a first slotted surface, a cover plate member having a first nonslotted surface, means for alternately engaging in mating relationship and separating the first surfaces of said slotted and cover plate members to thereby form a channel between said plate members in the engaged state thereof, means for supplying a pressurized fluid to said channel centrally thereof, said channel being enclosed along its sides in the engaged state of said plate members except for a port supplying the pressurized fluid into said channel, said channel adapted for passage of a small cross section, continuous material therethrough whereby the pressurized fluid upon issuance from said port restrictively flows along said channel from the center to the ends thereof, the back pressure induced at said port resulting from the restriction caused by the material passing through said channel being proportional to he magnitude of a selected parameter of the material being monitored by the apparatus, means for collecting the strands of a multi-strand yarn material being monitored by the apparatus and for forcing the collected strands into said slot in said slotted plate member, and said strand collecting and forcing means being retained on said cover plate member on a surface thereof opposite from the first nonslotted surface, said strand collecting and forcing means being operative with operation of said alternately engaging and separating means.

2. The apparatus set forth in claim 1 wherein said strand collecting and forcing means comprises a spring device including a central spring member retained between the surface of said cover plate member opposite from the first nonslotted surface thereof and an actuated member of said alternately engaging and separating means, and a pair of end spring members connected at opposite ends of said central spring member and extending beyond sides of the slotted and cover plate members wherein the ends of the channel are disposed, the extremities of said end spring members being concave-shaped and in an isolated position spaced from the longitudinal axis of the slot during the separated state of said plate members and being forced toward and beyond the axis in an initial engaged state whereby the strands of the multi-strand yarn material being threaded into the sensor head are collected by the concave-shaped extremeties of said end spring members and thence forced into the slot, the extremities of said end spring members being retracted to an isolated position in a subsequent engaged and locked state of said plate members which is the normal operating mode of the monitoring apparatus whereby the yarn material may be threaded into the sensor head without stopping the longitudinal motion of the yarn.

3. In the apparatus set forth in claim 2 wherein said central and end spring members are formed from a single piece of metal, and the slot is straight and provided with flared ends for ease of entrance and exit of the yarn material in its passage through the channel.

4. In an apparatus for monitoring a selected parameter of a small cross section, continuous material suitable for passage through an improved sensor head component of the apparatus, the improved sensor head comprising, a slotted plate member having a first slotted surface, a cover plate member having a first nonslotted surface, means for alternately engaging in mating relationship and separating the first surfaces of said slotted and cover plate members to thereby form a channel between said plate members in the engaged state thereof, said alternately engaging and separating means comprising a toggle clamp providing a hold-down action in the engaged state thereof, said toggle clamp comprising an actuating member, an actuated member coupled to said actuating member and comprising a lever arm having a driven end connected to said cover plate member at a surface thereof opposite from said first nonslotted surface, a nonmovable base having a fulcrum end of said lever arm connected thereto, said nonmovable base connected to said slotted plate member at a surface thereof opposite from said first slotted surface, means for mounting said slotted plate member in a stationary position whereby said cover plate member is alternately operated by said lever arm of said toggle clamp to provide engagement with and separation from said slotted plate member supported in a fixed position, means for supplying a pressurized fluid to said channel centrally thereof, said channel being enclosed along its sides in the engaged state of said plate members except for a port supplying the pressurized fluid into said channel, said channel adapted for passage of a small cross section, continuous material therethrough whereby the pressurized fluid upon issuance from said port restrictively flows along said channel from the center to the ends thereof, the back pressure induced at said port resulting from the restriction caused by the material passing through said channel being proportional to the magnitude of a selected parameter of the material being monitored by the apparatus, a spring device comprising a central spring member retained between the surface of said cover plate member opposite from said first nonslotted surface thereof and said driven end of said lever arm of said toggle clamp, and a pair of end spring members connected at opposite ends of said central spring member and extending beyond sides of said slotted and cover plate members wherein the ends of said channel are disposed, the extremities of said end spring members being concave-shaped and in an isolated position spaced from the longitudinal axis of said slot in said slotted plate member during the separated state of said plate members and being forced toward and beyond the axis in an initial engaged state whereby the strands of a multi-strand yarn material being threaded into the sensor had are collected by the concave-shaped extremities of said end spring members and thence forced into said slot in said slotted plate member, the extremities of said end spring members being retracted to an isolated position in a subsequent engaged and locked state of said plate members which is the normal operating mode of the sensor head whereby the yarn material may be threaded into the sensor head without stopping the longitudinal motion of the yarn.

5. In the apparatus set forth in claim 4 wherein said spring device further comprises means for retaining said end spring members and central spring member in alignment parallel with the longitudinal axis of the slot to insure the concave-shaped extremities of said end spring members being properly aligned with the yarn material in the initial engaged state of said plate members for proper collection of the strands of the yarn material.

* * * * *

PO-1050
(5/69)

UNITED STATES PATENT OFFICE
CERTIFICATE OF CORRECTION

Patent No. 3,667,282           Dated June 6, 1972

Inventor(s) Bert J. Czwakiel and Donald F. Miller

It is certified that error appears in the above-identified patent and that said Letters Patent are hereby corrected as shown below:

Claim 1, line 21, "he" should be -- the --

Claim 4, line 55, "had" should be -- head --

Signed and sealed this 6th day of March 1973.

(SEAL)
Attest:

EDWARD M. FLETCHER, JR.
Attesting Officer

ROBERT GOTTSCHALK
Commissioner of Patents